Aug. 26, 1969　　　D. J. QUICK　　　3,462,927

TOPPING MECHANISM FOR CANE HARVESTERS

Filed Jan. 19, 1967

INVENTOR
Donald J. Quick
By

United States Patent Office 3,462,927
Patented Aug. 26, 1969

3,462,927
TOPPING MECHANISM FOR CANE HARVESTERS
Donald J. Quick, Highton, Australia, assignor to International Harvester Company, Chicago, Ill., a corporation of Delaware
Filed Jan. 19, 1967, Ser. No. 610,314
Claims priority, application Australia, Jan. 19, 1966, 645/66
Int. Cl. A01d 45/10
U.S. Cl. 56—56                                3 Claims

ABSTRACT OF THE DISCLOSURE

A device controlled by the operator of a cane harvesting machine for causing the severed tops of cane stalks to be discharged either to the right or to the left of the harvesting machine. A pair of guide bars located in the throat formed by the gathering drums and adjustably mounted such that the severed cane tops will be directed into the influence of one selected gathering drum and thus discharged on a selected side of the machine.

Background of the invention

This invention relates to topping mechanisms for cane harvesters in which the severed tops of the cane may be selectively discharged on either side of the harvester.

The present invention is intended to be used on cane harvesting machines of the type disclosed in the patent to Joseph M. Mizzi, No. 3,307,338 issued on Mar. 7, 1967 and is an improvement upon the topping mechanism disclosed in the patent to Roy C. Ash, No. 3,398,515, issued on Aug. 27, 1968. Topping mechanisms usually comprise a cutter mounted for rotation on a vertical axis and a pair of gathering devices extending forwardly of the cutter and arranged to direct the cane tops inwardly and rearwardly therebetween to the cutter as the harvester progresses. The selective discharging of the tops to either side of the harvester is at present achieved by reversing the direction of the cutter, so that the cutter is moving towards the desired discharge side over the forward portion of its described path. The cutter thus tends to deflect the severed tops into the gathering device on the discharge side of the harvester and away from the other.

However, in practice, a reasonable proportion of the severed tops remain within the influence of the gathering device remote from the selected discharge side of the harvester, and are hence discharged from the other side into the standing crop, and interfere with the subsequent harvesting thereof. Furthermore, the drive transmission to permit reversal of the direction of rotation of the cutter is expensive to manufacture.

Summary

The general purpose of this invention is to provide a topping mechanism which embraces all the advantages of similarly employed topping mechanisms and possesses none of the aforedescribed disadvantages.

With the above stated principal purpose in view, there is provided according to the present invention a topping mechanism for a cane harvester comprising a cutter mounted for rotation about a vertical axis, a pair of laterally spaced gathering devices disposed forwardly of the cutter and arranged to direct the cane tops inwardly and rearwardly therebetween to the cutter, and guide means selectively adjustable to divert the cane tops from one gathering device into the other gathering device for discharge by the latter rearwardly thereof.

The guide means include a generally V-shaped fixed member mounted with the apex forward of the center of the cutter and the arms extending outwardly and rearwardly to either side of the topping mechanism. A guide bar extends forwardly in line with the apex of the fixed member and curves outwardly at the forward end. The guide bar is pivotally mounted at the rear end so that it may be selectively positioned with the curved forward end projecting toward either gathering device.

Thus in operation, the cane tops collected by the gathering device toward which the guide bar extends are diverted by the bar into the other gathering device which cooperates with the fixed guide member to discharge the severed tops from the side of the machine nearest said other gathering device. When it is desired to reverse the direction of disclosure, the guide bar is pivoted to project toward the other gathering device.

An object of the present invention is to provide a topping mechanism for a cane harvester which permits selective discharge of the severed tops to either side of the harvester without the previously stated disadvantages of the known mechanisms.

The invention will be more readily understood from the following description of one practical arrangement of the topping mechanism as illustrated in the accompanying drawings.

Description of the preferred embodiment

Figure 1:
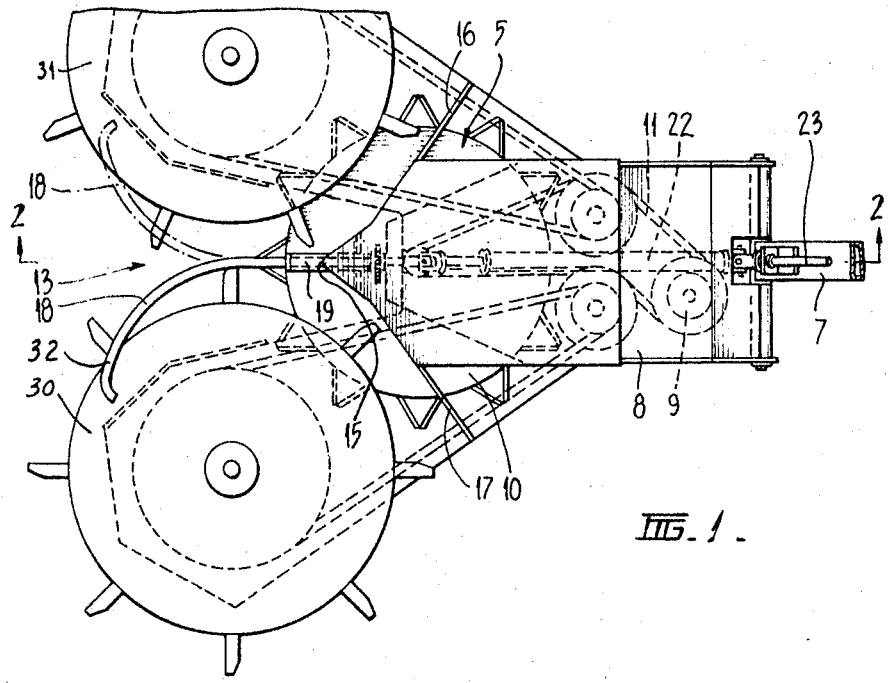
FIGURE 1 is a plan view of the topping mechanism.
Figure 2:
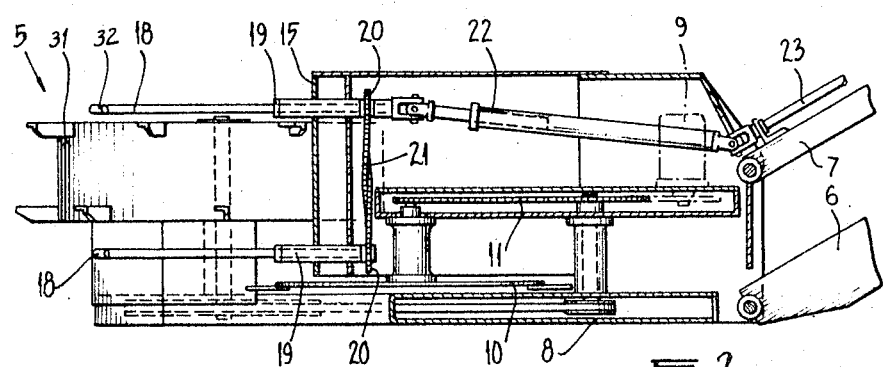
FIGURE 2 is a sectional elevation of the mechanism along line 2—2 in FIGURE 1.

Referring now to the drawings, the topping mechanism 5 is supported at the forward end of the boom 6 which may be raised and lowered in a known manner. The link 7 forms a parallelogram linkage with the boom to maintain the mechanism at a constant relationship to the horizontal as it is raised and lowered.

The topping mechanism comprises the support structure 8 upon which the hydraulic motor 9 and cutter 10 are mounted. The support structure 8 houses the drive transmission 11 that connects the motor 9 to the cutter 10 and the gathering devices 30 and 31. The two gathering devices are mounted on forward extensions of the support structure to define a throat 13 therebetween, through which the cane tops are delivered to the cutter 10.

Guide means including a fixed guide plate 15 of a generally V-shape, as seen in FIGURE 1, is mounted on the support with the apex forward of, and in longitudinal alignment with the axis of the cutter. The guide plate includes arms 16 and 17 that extend outwardly and rearwardly from the apex beyond the extremities of the cutter 10 and rearwardly of the respective gathering devices. The guide plate is of a height so as to extend above and below the level of the gathering devices.

The guide means also includes a pair of vertically spaced guide members or bars 18 journalled in bearings 19, for rotation about respective horizontal axes one above and one below the gathering devices and in a vertical plane centrally disposed between the gathering devices.

Each guide bar 18 extends forwardly from the apex of the guide plate 15 and is formed at the forward end with an outwardly sweeping curved portion 32 which will terminate radially inwardly of the periphery of one or the other of the gathering drums in its respective operating positions.

Figure 3:
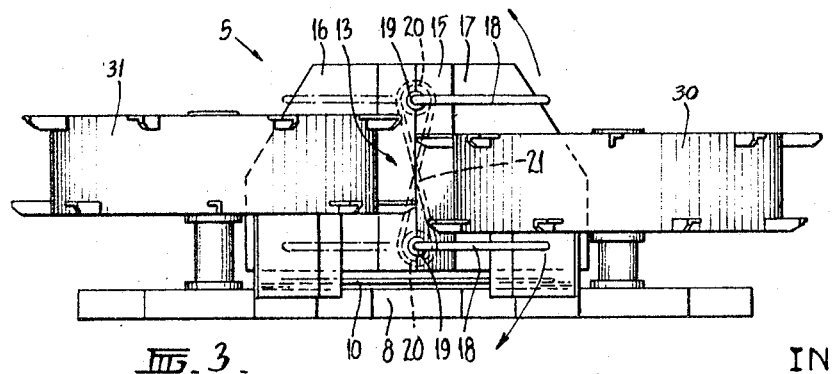
FIGURE 3 is a front elevation of the mechanism shown in FIGURE 1.

The guide bars 18 have selection means attached at their rearward ends including sprockets 20 coupled by a crossed drive chain 21. The upper bar is extended rearwardly from the sprocket and is coupled by an expandable shaft 22 to a shaft 23 which terminates in a crank (not shown) near the operator's seat. Thus, by turning the crank through half a revolution, the guide bars 18 rotate in opposite directions from a position above and below one gathering drum shown in full outline in FIGURES 1 and 3 to a corresponding position relative to the other gathering drum as shown in dotted outline.

With this construction, the guide bars 18 can be positioned to divert the cane tops collected by the gathering drum remote from the discharge side of the machine into the other gathering drum, and after severing by the cutter 10, the tops are discharged to the side of the machine by said other gathering drum cooperating with the portion of the fixed guide plate disposed rearwardly thereof.

Considering, for example, the arrangement of the guide bars 18 as shown in full outline in FIGURE 1, the gathering device 30 is rotating in a clockwise direction and the device 31 in a counterclockwise direction so that the portions thereof defining the throat 13 are both moving rearwardly towards the cutter 10.

The guide bars 18 are located so that the forward ends of the curved portions 32 are disposed above and below the gathering device 30 so that the cane tops collected by device 30 are deflected by the bars 18 out of the influence of the device 30 and into the influence of device 31 as they move through the throat 13 towards the cutter. Thus, after the cane tops are severed by the cutter, they will be carried by the device 31 along the passage defined by the device 31 and arm 16 of the guide plate, to be discharged behind the device 31.

The tops will, of course, be discharged on the opposite side of the mechanism when the guide bars are in the position shown in dotted outline in FIGURE 1.

I claim:

1. A topping mechanism for a cane harvester comprising a support structure,
    a cutter mounted on said support structure for rotation about a vertical axis,
    a pair of laterally spaced gathering devices mounted on said support structure disposed forwardly of the cutter and arranged to direct the cane tops inwardly and rearwardly therebetween to the cutter,
    guide means mounted on said support structure adapted to divert the cane tops from one gathering device into the influence of the other gathering device for discharge by said other gathering device rearwardly and away from said one gathering device.
    said guide means including a guide member mounted above the cutter for rotation about a horizontal axis extending between the gathering devices, said guide member extending forwardly beyond the cutter and terminating in a section curved forwardly and outwardly from said axis, and
    selection means to rotate said guide member to selectively position the forward end toward one or the other of the gathering devices such that the cane tops can be directed into the influence of either gathering device.

2. The invention as set forth in claim 1 wherein the guide means further includes a generally V-shaped fixed member mounted with the apex forward of the center of the cutter and the arms extending outwardly and rearwardly behind the respective gathering devices to form with the latter passages for the discharge of the cane tops.

3. A topping mechanism for a cane harvester comprising a support structure,
    a cutter mounted on said supoprt structure for rotation about a vertical axis,
    a pair of laterally spaced gathering devices mounted on said support structure disposed forwardly of the cutter and arranged to direct the cane tops inwardly and rearwardly therebetween to the cutter,
    guide means mounted on said support structure adapted to divert the cane tops from one gathering device into the influence of the other gathering device for discharge by said other gathering device rearwardly and away from said one gathering device,
    said guide means including a pair of guide members spaced vertically from each other, said pair of guide members mounted above the cutter for rotation about horizontal axes extending between the gathering devices, said pair of guide members extending forwardly beyond the cutter and terminating in sections curved forwardly and outwardly from said axes, and
    selection means to rotate said pair of guide members to selectively position their forward ends toward one or the other of the gathering devices such that the cane tops can be directed into the influence of either gathering device.

References Cited

UNITED STATES PATENTS 3,325,982   6/1967   Fogels et al. _____ 56—56

ROBERT E. PULFREY, Primary Examiner
WALTER J. CONLON, Assistant Examiner

U.S. Cl. X.R.
56—119